United States Patent
Bögert et al.

(10) Patent No.: US 6,684,665 B1
(45) Date of Patent: Feb. 3, 2004

(54) DEVICE FOR DRIVING TWO MOLD HALVES OF A GLASS FORMING MACHINE

(75) Inventors: Hermann Bögert, Auetal (DE); Thomas Hartmann, Bückeburg (DE); Heinz Hermening, Porta Westfalica (DE)

(73) Assignee: Hermann Heye, Obernkirchen (DE)

( * ) Notice: Subject to any disclaimer, the term of this patent is extended or adjusted under 35 U.S.C. 154(b) by 268 days.

(21) Appl. No.: 09/807,226

(22) PCT Filed: Jul. 13, 2000

(86) PCT No.: PCT/EP00/06701
§ 371 (c)(1),
(2), (4) Date: Apr. 9, 2001

(87) PCT Pub. No.: WO01/19739
PCT Pub. Date: Mar. 22, 2001

(30) Foreign Application Priority Data

Sep. 15, 1999 (DE) ................... 299 16 216 U (51) Int. Cl.⁷ ............................................. C03B 11/16
(52) U.S. Cl. ............................................ 65/360; 65/361
(58) Field of Search ............... 65/307, 357, 359, 65/360, 361; 425/450.1, 451.3, 451.5

(56) References Cited

U.S. PATENT DOCUMENTS

| | | | |
|---|---|---|---|
| 1,911,119 A | 5/1933 | Ingle | |
| 1,974,841 A | 9/1934 | Allen | 49/42 |
| 2,748,536 A | 6/1956 | Allen | 49/41 |
| 3,021,644 A | 2/1962 | Lauck | 49/41 |
| 3,066,505 A | 12/1962 | Allen | 65/159 |
| 3,798,019 A * | 3/1974 | Bystrianyk et al. | 65/360 |
| 3,951,637 A * | 4/1976 | Schaar | 65/229 |
| 4,295,873 A * | 10/1981 | Trutner et al. | 65/108 |
| 4,388,099 A * | 6/1983 | Hermening et al. | 65/267 |
| 4,449,996 A * | 5/1984 | Irwin et al. | 65/305 |
| 4,486,215 A * | 12/1984 | Irwin et al. | 65/360 |
| 4,543,118 A * | 9/1985 | Nebelung | 65/360 |
| 5,019,147 A | 5/1991 | Voisine et al. | 65/360 |
| 6,102,685 A * | 8/2000 | Miura et al. | 425/193 |
| 6,557,380 B1 * | 5/2003 | DiFrank et al. | 65/359 |

FOREIGN PATENT DOCUMENTS

| | | | |
|---|---|---|---|
| DE | 1 704 112 | 1/1974 | C03B/9/40 |
| EP | 0 195 599 | 3/1986 | C03B/9/353 |

* cited by examiner

Primary Examiner—James Derrington
Assistant Examiner—Carlos Lopez
(74) Attorney, Agent, or Firm—Synnestvedt & Lechner LLP (57) ABSTRACT

Device for driving two mold half holders of a glass molding machine On a glass molding machine (5) holders (2; 3) are pivotally mounted about an axis (4). Each holder (2; 3) has mold tool halves (6; 7). A first joint bar (10) is articulated at a first articulation point (9) of each holder (2; 3). A second joint bar (12) is articulated at a second articulation point (11) of the first joint bar (10), which second joint bar is articulated for its part at a third articulation point (13) of the glass molding machine (5). A rod (14) is also articulated at the second articulation point (11) and is articulated with its other end at a crank pin (15) of a crank (16). Each of the two cranks (16) is coaxially connected to a toothed wheel (17; 18). The toothed wheels (17; 18) are in engagement with a worm (21) on diametrically opposite sides, which worm can be rotationally driven in a reciprocating manner by an electric servomotor (29) via a gear mechanism (30).

32 Claims, 7 Drawing Sheets

DEVICE FOR DRIVING TWO MOLD HALVES OF A GLASS FORMING MACHINE

BACKGROUND

The invention relates to machines for molding glass, and more particularly to a device for driving a first and second holder mounted displaceably on a glass molding machine in a reciprocating manner.

In known devices of this type (U.S. Pat. No. 3,066,505 A, U.S. Pat. No. 3,021,644 A, U.S. Pat. No. 2,748,536 A and U.S. Pat. No. 1,974,841 A) the journals are each attached to a carriage which can be displaced in a linear manner in a longitudinal plane of the glass molding machine. In both of the first two US patent documents listed above, a rack on the carriage is in engagement with a pinion which is connected to another pinion via a shaft. The other pinion is in engagement with another rack which can be driven in a reciprocating manner by the common drive. In U.S. Pat. No. 2,748,536 A the carriage is driven by a piston-cylinder unit and in U.S. Pat. No. 1,974,841 A it is driven by a driving roller running on a curved track. Due to undesirable tolerances, these devices are expensive, liable to failure and insufficiently precise in their movements.

In the case of a device which is known per se (U.S. Pat. No. 1,911,119 A, FIGS. 3, 8 and 19) the two holders can pivot about a common perpendicular column of the machine. A joint bar is articulated at an articulation point of each holder in the proximity of a mold toot half. The other end of the joint bar is articulated in each case to a crank pin of a crank. The crank is attached to a respective shaft mounted on the machine. The two shafts are rotationally driven in a reciprocating manner by means of a common double-acting piston-cylinder unit via a lever mechanism.

A similar device is known per se from the German patent document 1 704 112, FIGS. 2 to 5. The two shafts in this case, however, are rotationally driven in a reciprocating manner by a common pneumatic rotating cylinder via a spur wheel reducing gear.

It is the object of the invention to improve and simplify the reciprocating driving of the holders.

SUMMARY OF THE INVENTION

The above object is achieved by the features of the invention which provides, in one form, a device for driving a first and second holder mounted displaceably on a glass molding machine in a reciprocating manner. Each of the first and second holders has at least one mold tool half, the mold tool half of the first holder and the mold tool half of said second holder cooperating together to form a mold tool for production of a hollow glass object. The first holder has a first articulation point. A first joint bar is articulated to the first holder at the first articulation point and has a second articulation point. A second joint bar is articulated to the first joint bar at the second articulation point which is disposed at a distance from the first articulation point, the second joint bar being articulated to the glass molding machine at a third articulation point which is disposed at a distance from the first articulation point and the second articulation point. A rod is articulated at the second articulation point. A first crank is provided for moving the first holder and a second crank for moving the second holder, the rod being articulated to the first crank at a crank pin which is at a distance from the second articulation point and which is movable in a reciprocating manner. The device also includes first and second toothed wheels, the first crank being connected coaxially to the first toothed wheel and the second crank being connected coaxially to the second toothed wheel. The toothed wheels are rotationally driven by a drive in opposite directions from one another to drive the first and second cranks.

During the process of molding hollow glass objects, forces are generated inside the mold tools, both in the preform molds of the preform mold station and also in the finishing molds of the finishing mold station, which urge the opening of the closed mold tools. Any such opening is undesirable as the molten glass can be pressed into the parting lines of the mold sections as they part from one another. Numerous additional devices are known in the prior art with which the closed mold tools can be forcibly held closed during the molding processes. Such additional devices for holding the tools closed are superfluous in the case of the present invention. With the invention the closed-holding function of the drive is supported by the lever mechanism by which the whole mechanism between the drive and the holders becomes desirably non-linear. The lever mechanisms cause the closed-holding force to be increased when the holders, and therefore the mold tools, are in the closed position. The movement of the holders can be achieved in a known manner either by pivoting or by linear displacement. By means of both toothed wheels and the drive it is possible to form the device in a generally simple, cost-effective and space-saving manner and for the device still to produce extremely precise opening and closing movements for the holders.

Additional features can provide other advantages. For example, the toothed wheels can be formed as a first and a second worm wheel which is in engagement with a common worm that can be rotationally driven in a reciprocating manner by the drive. Additionally, the worm wheels can be in engagement with diametrically opposite sides of the worm. Moreover, the worm can have a longitudinal axis that is disposed in a longitudinal plane of the device. Such features each provide a compact and stable embodiment of the device.

In another embodiment, the toothed wheels can be formed as mutually engaged spur wheels, and a shaft of one of the spur wheels can be rotationally driven in a reciprocating manner by the drive. In accordance with such features, a particularly simple and functionally reliable toothed wheel mechanism is produced. The spur wheels can be toothed in any suitable way, for example with straight or inclined toothing.

In the invention, the drive can comprise an electric servomotor. This permits a very precise programmable control of the closing and opening movements of the holders. To achieve sufficient closed-holding forces the torque of the electric servomotor can remain switched through during the molding processes. Furthermore, the drive can comprise a gear mechanism connected downstream of the electric servomotor. According to this feature, the mechanism can be arranged according to the respective requirements. For example, a reducing gear and/or, for reasons of space, an angular gear may be used.

BRIEF DESCRIPTION OF THE DRAWINGS

These and other features and advantages of the invention will be explained in more detail hereinunder with the aid of the exemplified embodiments illustrated in the drawings in which.

DETAILED DESCRIPTION OF THE INVENTION

Figure 1:
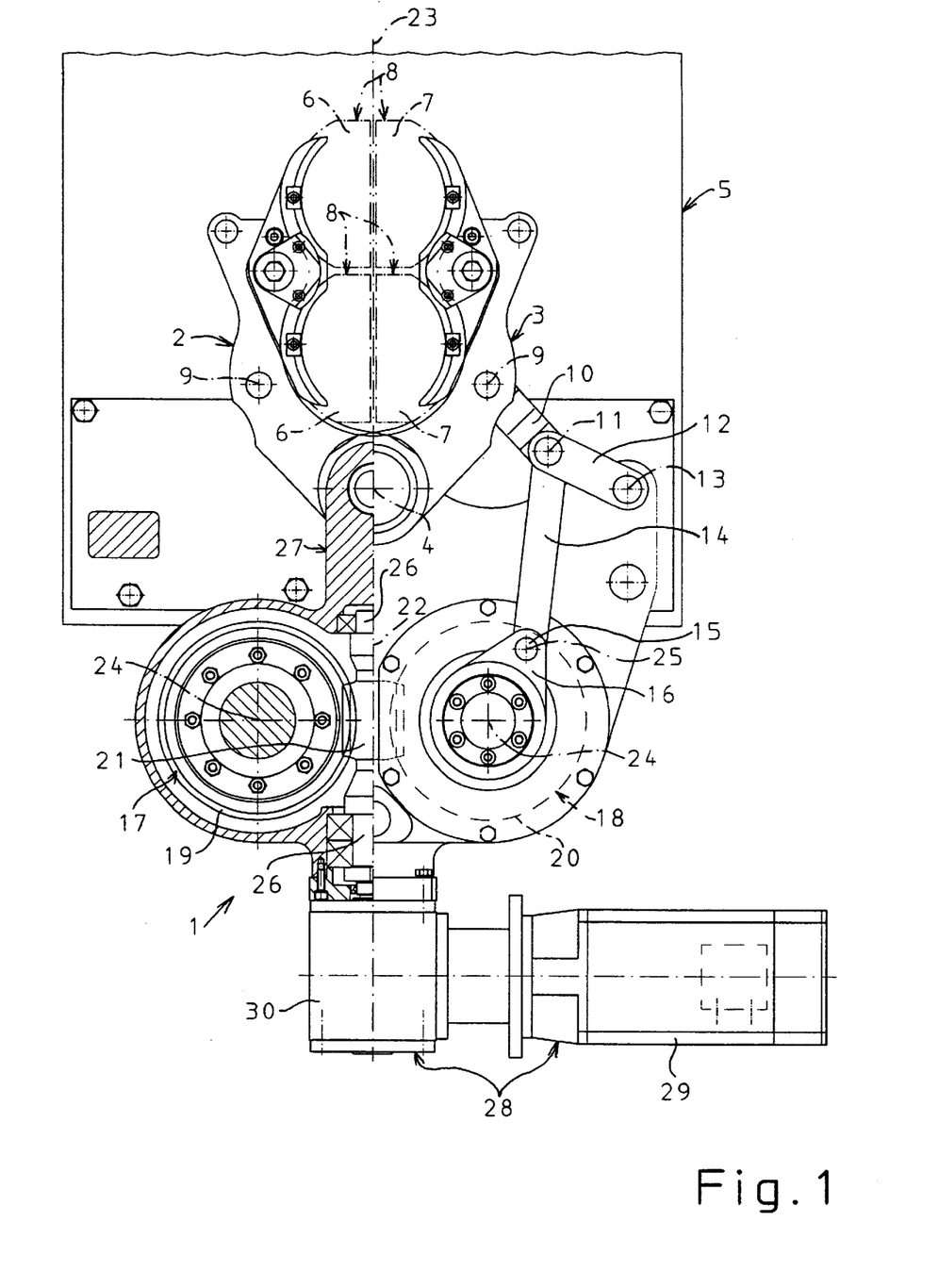
FIG. 1 is a plan view of a first embodiment of the device, partially in cross-section.

FIG. 1 shows a device 1 for the reciprocating drive of a first holder 2 and of a second holder 3 which are mounted in such a way as to be able to pivot about a pivot axis 4 of a glass molding machine 5 not shown in detail. The first holder 2 has two first mold tool halves 6 and the second holder 3 two second mold tool halves 7.

In the fully closed position of the holders 2, 3 shown in FIG. 1, opposite mold tool halves 6, 7 form a respective mold tool 8, for example a preform mold or a finishing mold for production of a hollow glass object.

At a first articulation point 9 of each holder 2, 3 a first joint bar 10 is articulated, of which FIG. 1 shows only that of the second holder 3. At a distance from the first articulation point 9 a second joint bar 12 is articulated to each first joint bar 10 at a second articulation point 1. Each second joint bar 12 is articulated at a third articulation point 13 of the glass molding machine 5, disposed at a distance from the first articulation point 9 and the second articulation point 11.

A rod 14 is also articulated at each second articulation point 11 and for its part is articulated at a crank pin 15 of a crank 16, at a distance from the second articulation point 11. Each of the two cranks 16 is attached coaxially to a first toothed wheel 17 or a second toothed wheel 18. The toothed wheels 17, 18 are formed in the exemplified embodiments of FIGS. 1 to 6 as a first worm wheel 19 and a second worm wheel 20. The worm wheels 19, 20 are in engagement with a worm 21 on diametrically opposite sides. A longitudinal axis 22 of the worm 21 is disposed in a longitudinal plane 23 of the device 1. Longitudinal axes 24 of the cranks 16 and longitudinal axes 25 of the crank pins 15 extend at a right angle to and at a distance from the longitudinal axis 22 of the worm 21. A shaft 26 of the worm 21 is rotatably mounted in a housing 27 of the glass molding machine 5. The shaft 26 is rotationally driven in a reciprocating manner by a drive 28. The drive 28 comprises an electric servomotor 29 and a gear mechanism 30, in this case an angular gear, connected downstream of the electric servomotor 29 and in driving connection with the shaft 26. In this way the cranks 16 are rotationally driven in a reciprocating manner in opposite directions by the common drive 28. The holders 2, 3 then pivot synchronously in a reciprocating manner about the pivot axis 4 between the fully closed position shown in FIG. 1 and a fully opened position shown on the left side of FIG. 3.

Figure 2:
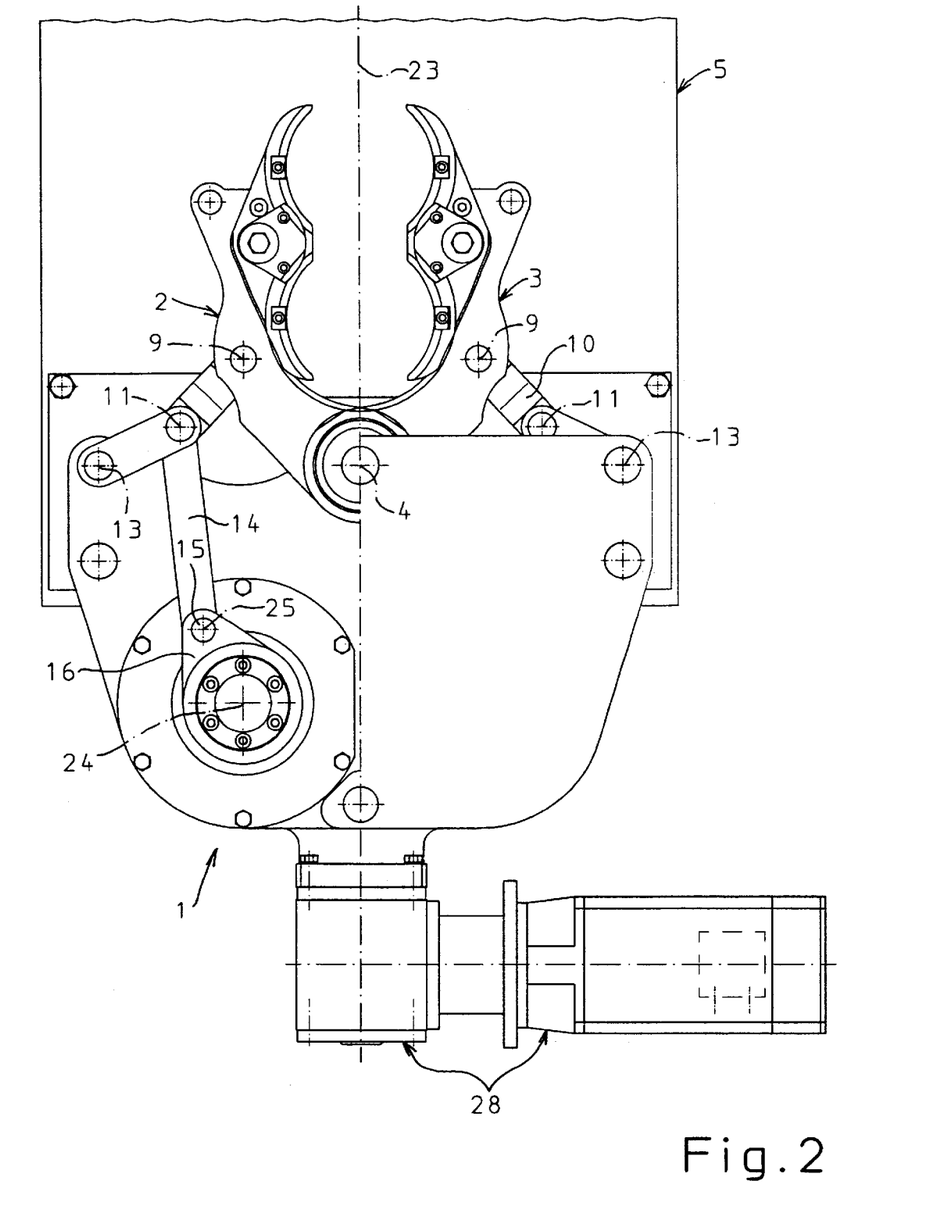
FIG. 2 is another plan view of the device according to FIG. 1.

FIG. 2 shows further details of the transmission path for the first holder 2.

Figure 3:
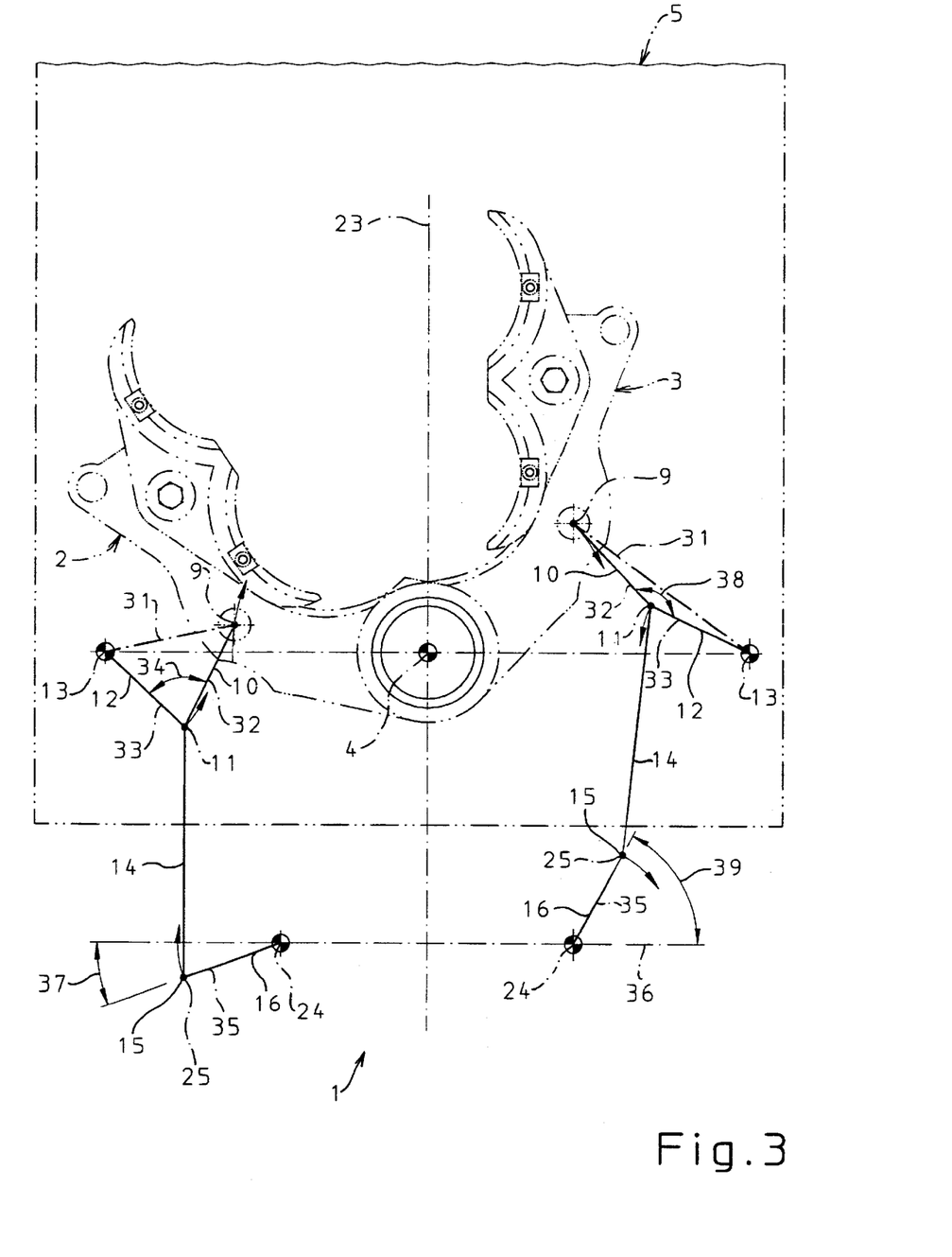
FIG. 3 shows parts of the device according to FIGS. 1 and 2 in a schematic manner.

With the aid of the schematic FIG. 3 the operational progress during operation of the device 1 is explained. In this exemplified embodiment the first articulation point 9 is disposed in the proximity of the mold tool halves 6, 7 (FIG.

1) respectively. The second articulation point 11 is disposed in all operating conditions on one side of a connecting line 31 between the first articulation point 9 and the third articulation point 13. This side faces the respective crank 16.

In the fully opened position of the holders 2, 3 shown on the left in FIG. 3, longitudinal axes 32 and 33 of the first joint bar 10 and of the second joint bar 12 respectively form an acute angle 34 with each other. The angle 34 is, for example 72°. In this fully opened position of the holders 2, 3 a connecting plane 35 connecting the longitudinal axis 25 of the crank pin 15 to the longitudinal axis 24 of the crank 16 is disposed respectively on a first side of a transverse plane 36 of the device 1 extending through the longitudinal axes 24, 24 of the two cranks 16, 16. This first side faces away from the holders 2, 3. In this fully opened position of the holders 2, 3 the connecting plane 35 and the transverse plane 36 form an acute angle 37 between them. This angle 37 is, for example 20°.

In the fully closed position of the holders 2, 3 shown on the right side in FIG. 3 and also shown in FIGS. 1 and 2, the connecting plane 35 is disposed respectively on a second side of the transverse plane 36. This second side faces the holders 2, 3. The connecting plane 35 and the transverse plane 36 form an acute angle 39 between them of, for example 60°. At the same time the axes 32, 33 respectively form an obtuse angle 38 with each other of, for example 158°.

Figure 4:
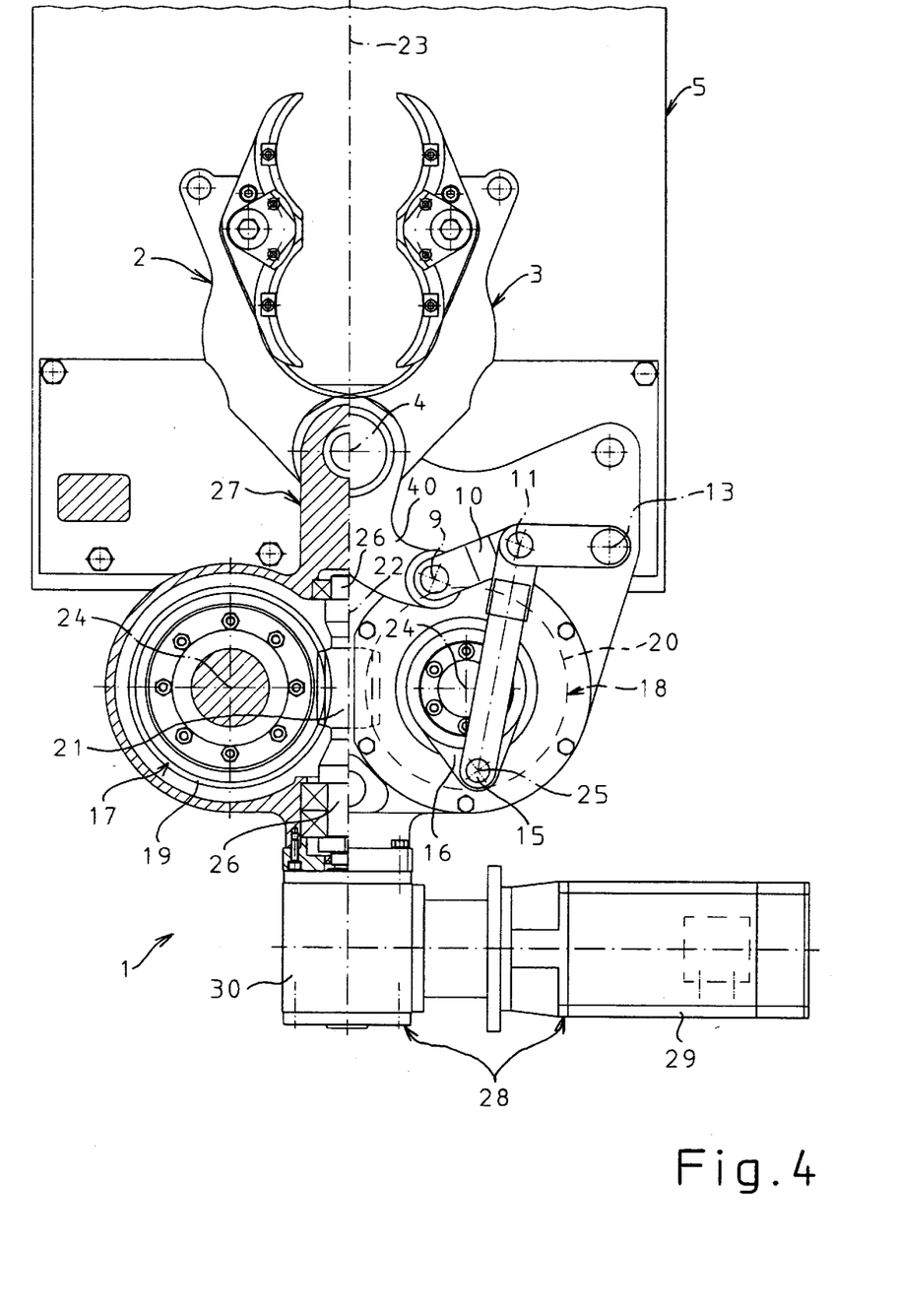
FIG. 4 shows the plan view of a further embodiment of the device, partially in cross-section.
Figure 5:
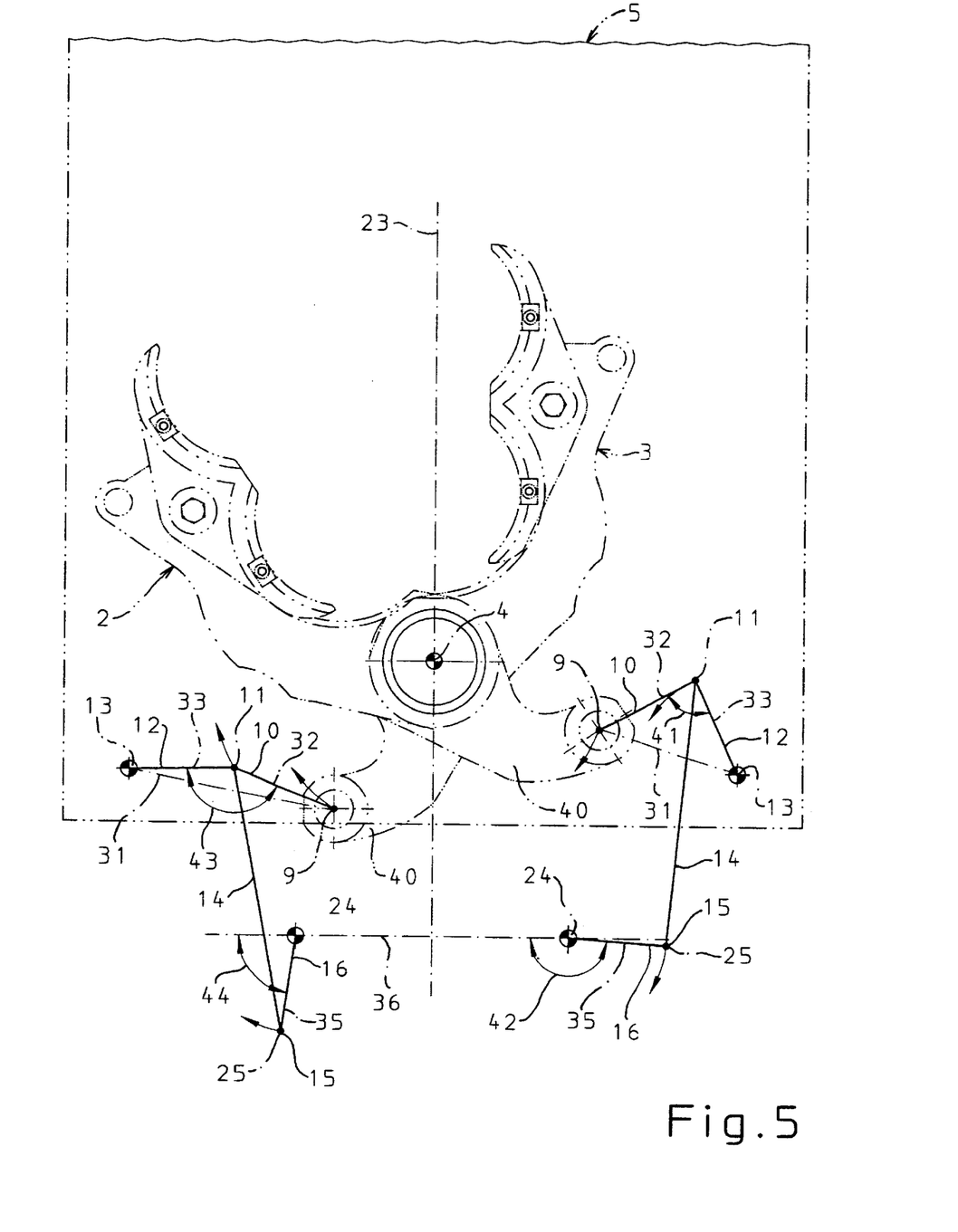
FIG. 5 shows parts of the device according to claim 4 in a schematic manner.

The embodiment of the device 1 according to FIGS. 4 and 5 is similar to that in accordance with FIGS. 1 to 3. However, the first articulation point 9 is disposed respectively on a rearwards protrusion 40 on the holders 2, 3 extending beyond the pivot axis 4.

In the fully opened position of the holders 2, 3 shown on the left side of FIG. 5, the longitudinal axes 32, 33 of the joint bars 10, 12 respectively form an angle 41 with each other with is at least approximately a right angle. In this fully opened position the connecting plane 35 and the transverse plane 36 also form an obtuse angle 42, for example 175° with each other.

In the fully closed position of the holders 2, 3 shown on the right in FIG. 5, the longitudinal axes 32, 33 of the joint bars 10, 12 respectively form an obtuse angle 43 with each other. In this fully closed position of the holders 2, 3 the connecting plane 35 and the transverse plane 36 form an acute angle 44 of, for example 82° with each other.

As also shown in FIG. 3, this geometry of the lever mechanism 16, 14, 10, 12 also leads in FIG. 5 to strengthening of the closed-holding forces applied by the electric servomotor 29.

The effective length of the joint bars 10, 12 between their articulation points 9, 11; 11, 13 is the same.

In all figures of the drawings the same parts are provided with the same reference numbers.

Figure 6:
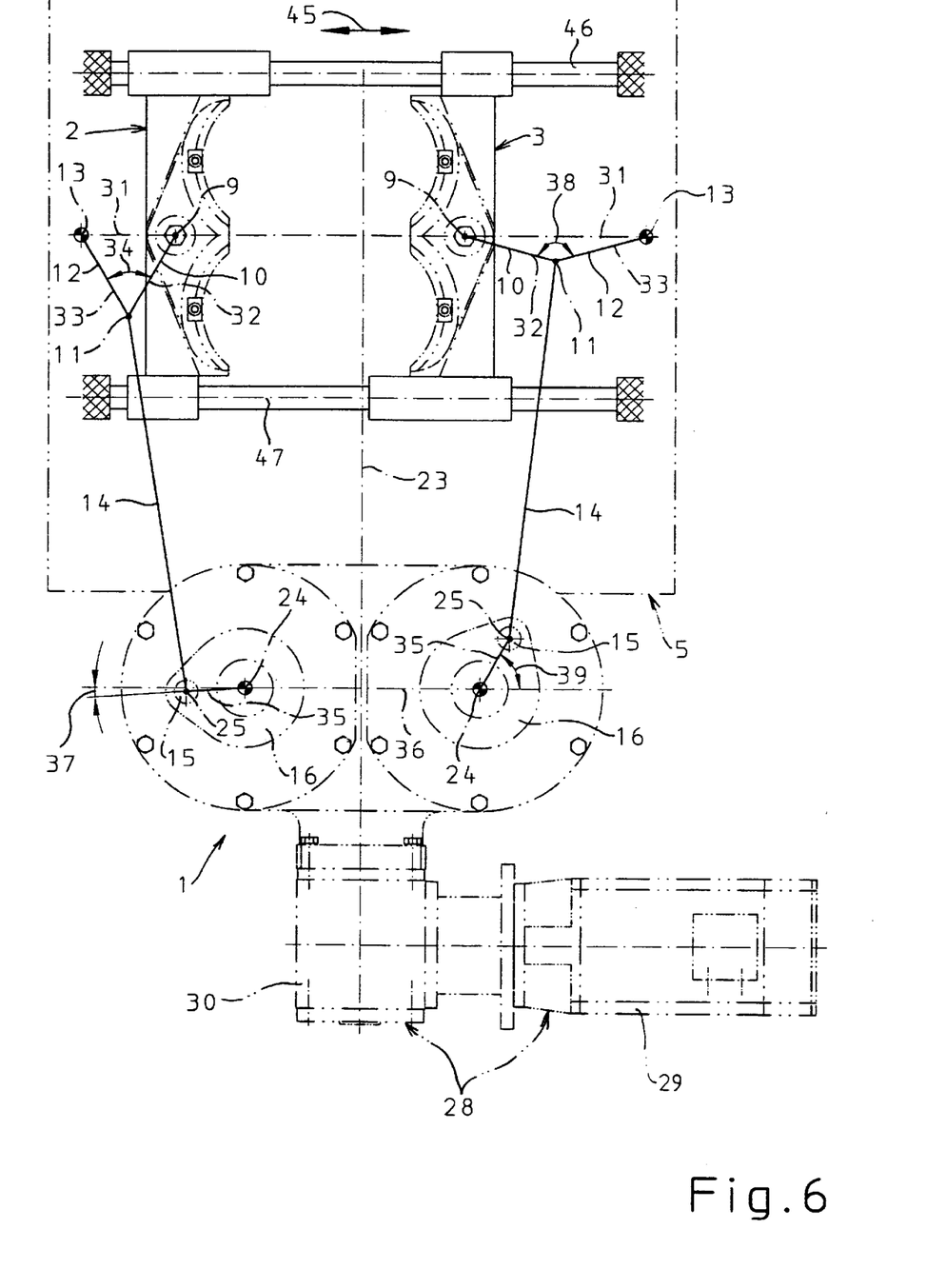
FIG. 6 shows the plan view of a further embodiment of the device.

In the exemplified embodiment according to FIG. 6, the device 1 serves for so-called parallel closing and opening of the holders 2, 3 in the directions of a double arrow 45. On their paths from the opened to the closed position and back the holders 2, 3 are linearly guided in FIG. 6 by guides 46 and 47 of the glass molding machine 5.

In FIG. 6 the gear mechanism 30 drives the same worm gear 21, 19, 20 as in the previous figures. The lever mechanisms 16, 14, 12, 10 in FIG. 6 are similar to those in FIGS. 1 to 3.

In the fully opened position of the holders 2, 3 shown on the left in FIG. 6 the angle 34 is, for example 60°. The angle 37 in FIG. 6 is about 4°, for example.

In the fully closed position of the holders 2, 3 shown on the right in FIG. 6, the acute angle 39 is, for example 60°. At the same time the longitudinal axes 32, 33 respectively form an obtuse angle 38 of, for example 150° with each other.

Figure 7:
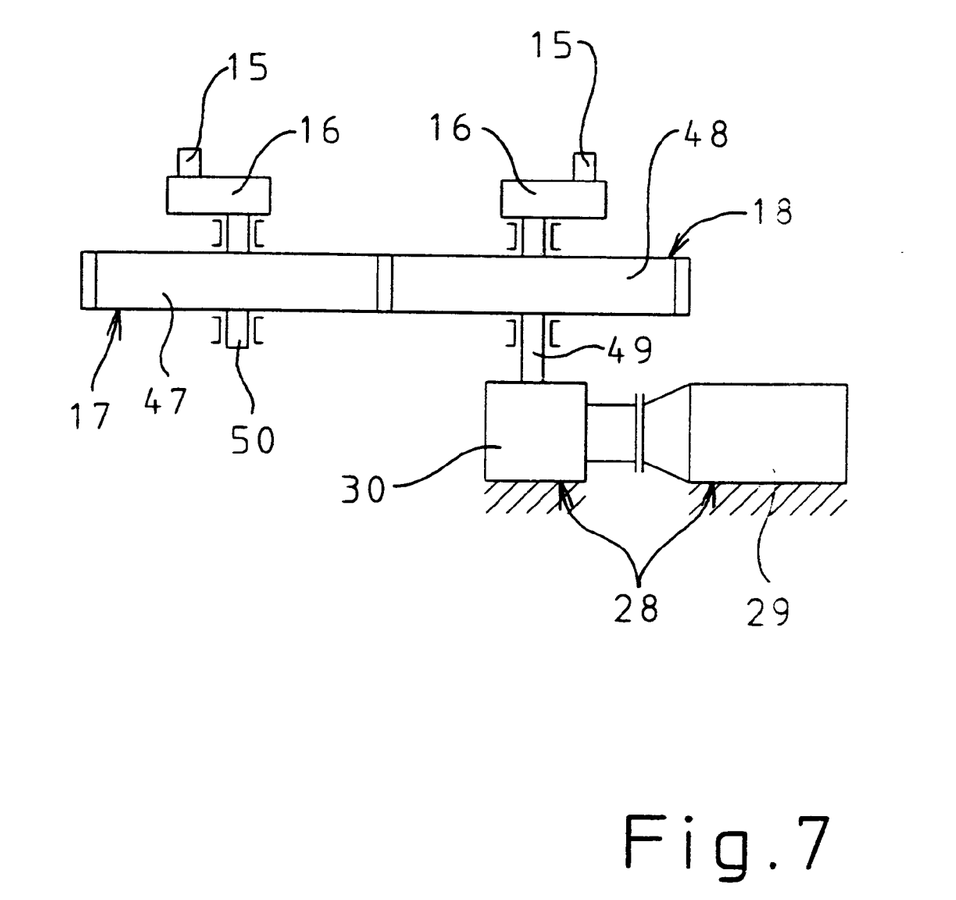
FIG. 7 shows another embodiment for the toothed wheels and their drive in a side view.

In the exemplified embodiment according to FIG. 7 the first toothed wheel 17 and the second toothed wheel 18 are formed as a first spur wheel 47 and a second spur wheel 48 which are in engagement with each other. A shaft 49 of the second spur wheel 48 can be rotationally driven in a reciprocating manner by the drive 28. The drive 28 could alternatively also drive a shaft 50 of the first spur wheel 47.

What is claimed is:

1. A device for driving a first and second holder mounted displaceably on a glass molding machine in a reciprocating manner, said device comprising:

each of said first and second holders having at least one mold tool half, said mold tool half of said first holder and said mold tool half of said second holder cooperating together to form a mold tool for production of a hollow glass object, said first holder having a first articulation point;

a first joint bar articulated to said first holder at said first articulation point, said first joint bar having a second articulation point;

a second joint bar articulated to said first joint bar at said second articulation point which is disposed at a distance from said first articulation point, said second joint bar being articulated to the glass molding machine at a third articulation point which is disposed at a distance from said first articulation point and said second articulation point;

a rod articulated at said second articulation point;

a first crank for moving said first holder, a second crank for moving said second holder, said rod being articulated to said first crank at a crank pin which is at a distance from said second articulation point and which is movable in a reciprocating manner; and first and second toothed wheels, said first crank connected coaxially to said first toothed wheel and said second crank connected coaxially to said second toothed wheel, said toothed wheels being rotationally driven by a drive in opposite directions from one another to drive said first and second cranks.

2. A device according to claim 1 wherein said first articulation point is disposed in the proximity of said mold tool half of said first holder, and said second articulation point is disposed, in all operating conditions, on one side of a connecting line between the first and the third articulation points on a side of said connecting line which faces said crank.

3. A device in accordance with claim 2, wherein said holders have a fully opened position, and wherein a longitudinal axis of the first joint bar and a longitudinal axis of the second joint bar form an acute angle with each other when said holders are in said fully opened position.

4. A device in accordance with claim 3 wherein when said holders are in said fully opened position, a connecting plane (35) connecting a longitudinal axis of the crank pin to a longitudinal axis of the first crank is disposed respectively on a first side of a transverse plane (36) of the device extending through the longitudinal axis of the first dank and a longitudinal axis of the second crank, which first side faces away from said holders.

5. A device in accordance with claim 4 wherein said connecting plane (35) and said transverse plane (36) form an acute angle with each other.

6. A device in accordance with claim 1, wherein said holders have a fully closed position, and wherein when said holders are in said fully closed position, longitudinal axes of the first and second joint bars respectively form an obtuse angle with each other.

7. A device in accordance with claim 2, wherein said holders have a fully closed position, and wherein when said holders are in said fully closed position, longitudinal axes of the first and second joint bars respectively form an obtuse angle with each other.

8. A device in accordance with claim 6 wherein when the holders are in said fully closed position, a connecting plane (35) connecting a longitudinal axis of the crank pin to a longitudinal axis of the first crank is disposed respectively on a second side of a transverse plane (36) of the device extending through the longitudinal axis of said first crank and a longitudinal axis of said second crank, which second side faces said holders.

9. A device in accordance with claim 7 wherein when the holders are in said fully closed position, a connecting plane (35) connecting a longitudinal axis of the crank pin to a longitudinal axis of the first crank is disposed respectively on a second side of a transverse plane (36) of the device extending through the longitudinal axis of said first crank and a longitudinal axis of said second crank, which second side faces the holders.

10. A device in accordance with claim 8 wherein the connecting plane (35) and the transverse plane (36) form an acute angle with each other.

11. A device in accordance with claim 9 wherein the connecting plane (35) and the transverse plane (36) form an acute angle with each other.

12. A device in accordance with claim 1 wherein each of said holders is mounted to be pivotable about a pivot axis of the glass molding machine, wherein said first articulation point is disposed on a rearwards protrusion on the first holder; and said second articulation point is disposed, in all operating conditions, on one side of a connecting line between the first and the third articulation points, which side faces away from said first crank.

13. A device in accordance with claim 12 wherein said holders have a fully opened position, and wherein when said holders are in said fully opened position, longitudinal axes of said first and second joint bars, respectively, form at least approximately a right angle with each other.

14. The device in accordance with claim 13 wherein when said holders are in said fully opened position, a connecting plane extending through a longitudinal axis of the crank pin and a longitudinal axis of the first crank respectively forms an obtuse angle with a transverse plane of the device that extends through the longitudinal axis the first crank and a longitudinal axis of the second crank.

15. A device in accordance with claim 12 wherein said holders have a fully closed position, at which position longitudinal axes of the first and second joint bar respectively form an obtuse angle with each other.

16. A device in accordance with claim 15 wherein when said holders are in said fully closed position, a connecting plane extending through a longitudinal axis of the crank pin and a longitudinal axis of the first crank respectively forms an acute angle with a transverse plane of the device that extends through the longitudinal axis of the first crank and a longitudinal axis of the second crank.

17. A device in accordance with claim 1 wherein an effective length of the first joint bar between said first and second articulation points, and an effective length of the second joint bar between said second and third articulation points is the same.

18. A device in accordance with claim 12 wherein an effective length of the first joint bar between said first and second articulation points, and an effective length of the second joint bar between said second and third articulation points is the same.

19. A device in accordance with claim 1 wherein said toothed wheels are formed as first and second worm wheels, respectively, and wherein said first and second worm wheels engage a common worm which can be rotationally driven by the drive.

20. A device in accordance with claim 12 wherein said toothed wheels are formed as first and second worm wheels, respectively, and wherein said first and second worm wheels engage a common worm which can be rotationally driven by the drive.

21. A device in accordance with claim 19 wherein said worm wheels engage diametrically opposite sides of said worm from each other.

22. A device in accordance with claim 20 wherein said worm wheels engage diametrically opposite sides of said worm from each other.

23. A device in accordance with claim 19 wherein said worm has a longitudinal axis disposed in a longitudinal plane of the device.

24. A device in accordance with claim 21 wherein said worm has a longitudinal axis disposed in a longitudinal plane of the device.

25. A device in accordance with claim 1 wherein said toothed wheels are formed as mutually engaged spur wheels, and wherein one of said spur wheels has a shaft that can be rotationally driven in a reciprocating manner by said drive.

26. A device in accordance with claim 12 wherein said toothed wheels are formed as mutually engaged spur wheels, and wherein one of said spur wheels has a shaft that can be rotationally driven in a reciprocating manner by said drive.

27. A device in accordance with claim 1 wherein said drive comprises an electric servomotor.

28. A device in accordance with claim 12 wherein said drive comprises an electric servomotor.

29. A device in accordance with claim 27 characterised in that the drive comprises a gear mechanism connected downstream of said electric servomotor.

30. A device in accordance with claim 28 characterised in that the drive comprises a gear mechanism connected downstream of said electric servomotor.

31. A device in accordance with claim 1 further comprising:

a said second holder having a first articulation point, another first joint bar articulated to said second holder at said first articulation point of said second holder, said another first joint bar having a second articulation point;

another second joint bar articulated to said another first joint bar at said second articulation point of said another first joint bar which is disposed at a distance from said first articulation point of said second holder, said another second joint bar being articulated to the glass molding machine at another third articulation point which is disposed at a distance from said first articulation point of said second holder and said second articulation point of said another first joint bar; and another rod articulated at said second articulation point of said another first joint bar, said another rod being articulated to said second crank at another crank pin which is at a distance from said second articulation point of said another first joint bar and which is movable in a reciprocating manner.

32. A device for driving a first and second holder mounted displaceably on a glass molding machine in a reciprocating manner, said device comprising:

each of said first and second holders having at least one mold tool half, said mold tool half of said first holder and said mold tool half of said second holder cooperating together to form a mold tool for production of a glass object, said first holder having a first articulation point;

a first joint bar articulated to said first holder at said first articulation point, said first joint bar having a second articulation point;

a second joint bar articulated to said first joint bar at said second articulation point disposed at a distance from said first articulation point, said second joint bar being moveably articulated to the glass molding machine at a third articulation point disposed at a distance from said first articulation point and said second articulation point;

a rod articulated at said second articulation point;

a crank capable of being driven by a drive, said rod being articulated to said crank at a distance from said second articulation point and movable in a reciprocating manner by said drive; and a tooth wheel rotationally driven by said drive and connected to said crank for driving said crank.

* * * * *

UNITED STATES PATENT AND TRADEMARK OFFICE
CERTIFICATE OF CORRECTION

PATENT NO. : 6,684,665 B1
DATED : February 3, 2004
INVENTOR(S) : Bogert et al.

It is certified that error appears in the above-identified patent and that said Letters Patent is hereby corrected as shown below:

Column 1,
Line 29, "toot" should be -- tool --;

Column 5,
Line 62, "dank" should be -- crank --.

Signed and Sealed this

First Day of November, 2005

JON W. DUDAS
*Director of the United States Patent and Trademark Office*